United States Patent
Khanna et al.

(10) Patent No.: US 8,868,692 B1
(45) Date of Patent: Oct. 21, 2014

(54) DEVICE CONFIGURATION BASED CONTENT SELECTION

(71) Applicant: Google Inc., Mountain View, CA (US)

(72) Inventors: Amit Khanna, Sunnyvale, CA (US); Ajay Ananth Krishna, Sunnyvale, CA (US); Prashast Khandelwal, Mountain View, CA (US); Subhadip Sarkar, Sunnyvale, CA (US); Jyotirmaya Manoj Akkad, San Francisco, CA (US); Shibani Sanan, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/136,684

(22) Filed: Dec. 20, 2013

Related U.S. Application Data (63) Continuation of application No. 13/897,242, filed on May 17, 2013.

(51) Int. Cl.
| | |
|---|---|
| G06F 15/16 | (2006.01) |
| H04L 12/24 | (2006.01) |
| H04N 21/00 | (2011.01) |
| H04L 29/06 | (2006.01) |
| H04L 29/08 | (2006.01) |

(52) U.S. Cl.
CPC ............ *H04L 41/0866* (2013.01); *H04N 21/00* (2013.01); *H04L 29/06863* (2013.01); *H04L 29/08198* (2013.01)
USPC ........................................................ 709/219

(58) Field of Classification Search
CPC ................... H04L 29/06863; H04L 29/08198; H04L 12/5691; G06F 17/30902; H04N 21/00
See application file for complete search history.

(56) References Cited

U.S. PATENT DOCUMENTS

| | | | |
|---|---|---|---|
| 8,145,222 B2 * | 3/2012 | Wormald et al. | 455/445 |
| 2008/0141379 A1 * | 6/2008 | Schmelzer | 726/26 |
| 2011/0040867 A1 * | 2/2011 | Kalbag | 709/224 |
| 2011/0126296 A1 * | 5/2011 | Moore | 726/28 |
| 2011/0238828 A1 * | 9/2011 | Grigsby et al. | 709/224 |
| 2012/0124209 A1 * | 5/2012 | Kalbag | 709/225 |
| 2012/0253939 A1 | 10/2012 | Grigoriev et al. | |
| 2012/0278185 A1 | 11/2012 | Ramachandran et al. | |
| 2012/0284114 A1 * | 11/2012 | Huang et al. | 705/14.45 |
| 2012/0284608 A1 * | 11/2012 | Huang et al. | 715/234 |
| 2013/0080263 A1 * | 3/2013 | Goldman et al. | 705/14.69 |
| 2013/0111328 A1 * | 5/2013 | Khanna et al. | 715/234 |
| 2013/0318125 A1 * | 11/2013 | Smith et al. | 707/781 |
| 2014/0006538 A1 * | 1/2014 | Oikonomou | 709/213 |
| 2014/0007182 A1 * | 1/2014 | Qureshi et al. | 726/1 |

OTHER PUBLICATIONS

Hristova et al., Ad-me: Wireless Advertising Adapted to the User Location, Deivce and Emotions, Proceedings of the 37th Hawaii International Conference on Systems Sciences—2004, 10 pages.

US Office Action on U.S. Appl. No. 13/897,242, DTD Feb. 20, 2014, 10 pages.

* cited by examiner

*Primary Examiner* — Krisna Lim
(74) *Attorney, Agent, or Firm* — Foley and Lardner LLP; John D. Lanza (57) ABSTRACT

Systems and methods include receiving an indication of a hardware or software configuration of a client device. Content associated with a downloadable application is identified by matching installation requirements for the application to the hardware or software configuration of the device.

20 Claims, 5 Drawing Sheets

DEVICE CONFIGURATION BASED CONTENT SELECTION

CROSS-REFERENCE TO RELATED PATENT APPLICATIONS

This application is a continuation of U.S. patent application Ser. No. 13/897,242, filed May 17, 2013, and entitled "Device Configuration Based Content Selection," the disclosure of which is hereby incorporated by reference in its entirety.

BACKGROUND

As development tools continue to evolve, the number of applications available for mobile and desktop devices is rapidly increasing. Applications are now available from entities that range from amateur programmers to software companies employing thousands of software developers. The types of applications available to users are diverse, allowing users to pick and choose how they want their devices to operate.

SUMMARY

Implementations of the systems and methods for content selection based on the configuration of a device are disclosed herein. One implementation is a method of selecting content for presentation by a device. The method includes receiving, at one or more processors, a content selection request to select third-party content for presentation by the device. The method also includes receiving an indication of a hardware or software configuration of the device. The method further includes identifying content associated with a downloadable application by matching installation requirements for the application to the hardware or software configuration of the device. The content includes a command configured to cause the device to navigate to an online service from which the application is available for download in response to the device receiving input from an interface device.

Another implementation is a system for selecting content for presentation by a device. The system includes one or more processors configured to receive a content selection request to select third-party content for presentation by the device. The one or more processors are also configured to receive an indication of a hardware or software configuration of the device. The one or more processors are further configured to identify content associated with a downloadable application by matching installation requirements for the application to the hardware or software configuration of the device. The content includes a command configured to cause the device to navigate to an online service from which the application is available for download in response to the device receiving input from an interface device.

A further implementation is a computer-readable storage medium having machine instructions stored therein, the instructions being executable by one or more processors to cause the one or more processors to perform operations. The operations include receiving a content selection request to select third-party content for presentation by a device. The operations also include receiving an indication of a hardware or software configuration of the device. The operations further include identifying content associated with a downloadable application by matching installation requirements for the application to the hardware or software configuration of the device. The content includes a command configured to cause the device to navigate to an online service from which the application is available for download in response to the device receiving input from an interface device.

These implementations are mentioned not to limit or define the scope of the disclosure, but to provide an example of an implementation of the disclosure to aid in understanding thereof. Particular implementations may be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

According to some aspects of the present disclosure, first-party and third-party content may be provided to a client device. As used herein, first-party content refers to the primary online content requested or displayed by the client device. For example, first-party content may be a webpage requested by the client or a stand-alone application (e.g., a video game, a chat program, etc.) running on the device. Third-party content, in contrast, refers to additional content that may be provided in conjunction with the first-party content. For example, third-party content may be a public service announcement or an advertisement that appears in conjunction with a requested webpage (e.g., a search result webpage from a search engine, a webpage that includes an online article, a webpage of a social networking service, etc.) or within a stand-alone application (e.g., an advertisement within a game, a messaging program, a navigation program, etc.).

Generally, a first-party content provider may be any content provider that allows another content provider (i.e., a third-party content provider) to provide content in conjunction with that of the first-party. The first-party content provider may or may not be compensated for allowing a third-party provider to provide content with the first-party provider's content. For example, the first-party provider may receive compensation for allowing certain paid public service announcements or advertisements to be provided in conjunction with the first-party provider's content.

A first-party content provider may allow a content selection service to determine which third-party content is to be provided in conjunction with the first-party provider's content. One or more third-party content providers may also use the content selection service to provide third-party content in conjunction with content from any number of first-party providers. In some cases, the content selection service may dynamically select which third-party content is presented in conjunction with a first-party provider's content. For example, a first-party webpage may display different advertisements selected by the service during different visits to the webpage. The content selection service may determine which third-party content is provided based on any number of factors. For example, a third-party advertisement for golf clubs may appear on a webpage devoted to reviews of golf resorts. The content selection service may also conduct a content auction to select the third-party content to be provided from among the various third-party content providers.

For third-party content that promotes a software application, the content may include a link that allows a user to purchase and/or download the application. However, the downloadable application may be configured for use only by specific types of devices based on the devices' hardware and/or software configurations (e.g., a device's operating system, other installed applications on the device, etc.). According to various implementations, a content selection service that selects third-party content for presentation by a device may be configured to allow a third-party content provider to either explicitly or implicitly limit the types of devices to which the third-party content is sent. For example, a third-party advertiser that is offering a game for download may explicitly specify that they only want advertisements for the game to be sent to mobile devices having a particular hardware configuration or running a specific version of an operating system. In another example, the system requirements may be retrieved automatically by the service from another source such as a website or an application marketplace from which the application is available for download.

Figure 1:
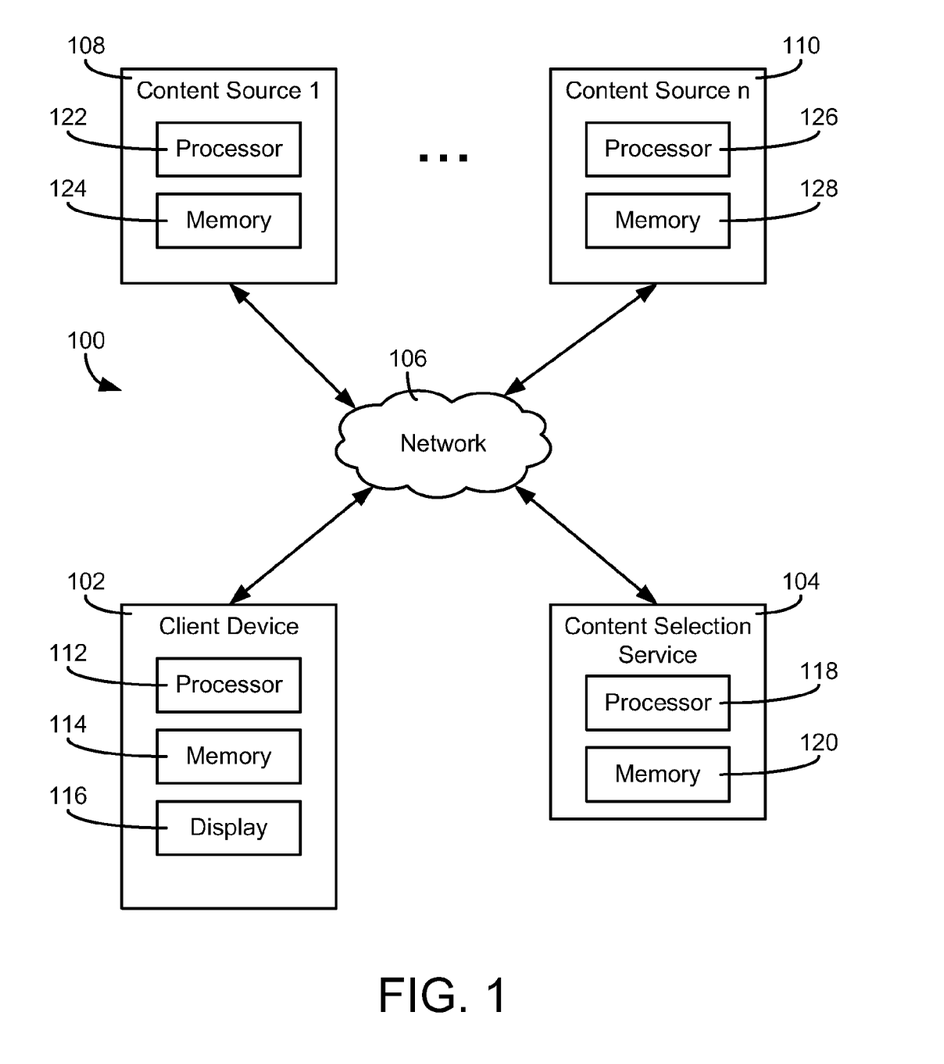
FIG. 1 is a block diagram of a computer system in accordance with various implementations.

Referring now to FIG. 1, a block diagram of a computer system 100 is shown, according to various implementations. System 100 includes a client device 102 which communicates with other computing devices via a network 106. Client device 102 may execute a web browser or other application (e.g., a video game, a messenger program, a media player, a social networking application, a navigation program, etc.) to retrieve content from other devices over network 106. For example, client device 102 may communicate with any number of content sources 108, 110 (e.g., a first content source through nth content source). Content sources 108, 110 may provide webpage data and/or other content, such as images, video, audio, or applications to client device 102. Computer system 100 may also include a content selection service 104 configured to select content to be provided to client device 102. For example, content source 108 may provide a first-party webpage to client device 102 that includes additional third-party content selected by content selection service 104. In another example, content selection service 104 may select a third-party advertisement for presentation within a non-browser application running on client device 102.

Network 106 may be any form of computer network that relays information between client device 102, content sources 108, 110, and content selection service 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, client device 102 may communicate wirelessly (e.g., via WiFi, cellular, radio, etc.) with a transceiver that is hardwired (e.g., via a fiber optic cable, a CAT5 cable, etc.) to other computing devices in network 106.

Client device 102 may be any number of different types of user electronic devices configured to communicate via network 106 (e.g., a laptop computer, a desktop computer, a tablet computer, a smartphone, a digital video recorder, a set-top box for a television, a video game console, combinations thereof, etc.). Client device 102 is shown to include a processor 112 and a memory 114. Memory 114 may store machine instructions that, when executed by processor 112 cause processor 112 to perform one or more of the operations described herein. Processor 112 may include one or more microprocessors, application specific integrated circuits (ASICs), field programmable gate arrays (FPGAs), other forms of processing circuits, or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions.

Client device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of client device 102 (e.g., a built-in display, microphone, etc.) or external to the housing of client device 102 (e.g., a monitor connected to client device 102, a speaker connected to client device 102, etc.), according to various implementations. For example, client device 102 may include an electronic display 116, which displays webpages and other data received from content sources 108, 110 and/or content selection service 104. In various implementations, display 116 may be located inside or outside of the same housing as that of processor 112 and/or memory 114. For example, display 116 may be an external display, such as a computer monitor, television set, or any other stand-alone form of electronic display. In other examples, display 116 may be integrated into the housing of a laptop computer, mobile device, or other form of computing device having an integrated display.

Content sources 108, 110 may be one or more electronic devices connected to network 106 that provide content to devices connected to network 106. For example, content sources 108, 110 may be computer servers (e.g., FTP servers, file sharing servers, web servers, etc.) or combinations of servers (e.g., data centers, cloud computing platforms, etc.). Content may include, but is not limited to, webpage data, a text file, a spreadsheet, images, search results, and other forms of electronic documents. Similar to client device 102, content sources 108, 110 may include processors 122, 126 and memories 124, 128, respectively, that store program instructions executable by processors 122, 126. For example, memory 124 of content source 108 may include instructions such as web server software, FTP serving software, or other types of software that cause content source 108 to provide content via network 106.

Similar to content sources 108, 110, content selection service 104 may be one or more electronic devices connected to network 106. Content selection service 104 may be a computer server (e.g., FTP servers, file sharing servers, web servers, etc.) or a combination of servers (e.g., a data center, a cloud computing platform, etc.). Content selection service 104 may have a processor 118 and a memory 120 that stores program instructions executable by processor 118. In cases in which content selection service 104 is a combination of computing devices, processor 118 may represent the collective processors of the devices and memory 120 may represent the collective memories of the devices.

Client device 102 may identify itself to content selection service 104 through the use of one or more device identifiers. Device identifiers may include, but are not limited to, cookies, universal device identifiers (UDIDs), device serial numbers, telephone numbers, or network addresses. For example, content selection service 104 may set a cookie on client device 102 when client device 102 visits a particular webpage. On subsequent webpage visits, the cookie may be sent by client device 102 to content selection service 104, allowing content selection service 104 to attribute the different webpage visits to the same client device.

According to various implementations, content sources 108, 110 may provide webpage data to client device 102 that includes one or more content tags. In general, a content tag may be any piece of webpage code associated with the action of including third-party content with a first-party webpage. For example, a content tag may define a slot on a webpage for third-party content, a slot for out of page third-party content (e.g., an interstitial slot), whether third-party content should be loaded asynchronously or synchronously, whether the loading of third-party content should be disabled on the webpage, whether third-party content that loaded unsuccessfully should be refreshed, the network location of a content source that provides the third-party content (e.g., content sources 108, 110, content selection service 104, etc.), a network location (e.g., a URL) associated with clicking on the third-party content, how the third-party content is to be rendered on a display, a command that causes client device 102 to set a browser cookie (e.g., via a pixel tag that sets a cookie via an image request), one or more keywords used to retrieve the third-party content, and other functions associated with providing third-party content with a first-party webpage. In other words, a content tag may cause client device 102 to send a content selection request to content selection service 104. For example, content source 108 may provide webpage data that causes client device 102 to retrieve third-party content from content selection service 104. In another implementation, content may be selected by content selection service 104 and provided by content source 108 as part of the first-party webpage data sent to client device 102. In a further example, content selection service 104 may cause client device 102 to retrieve third-party content from a specified location, such as memory 114 or content sources 108-110.

Content sources 108, 110 may also provide an executable application to client device 102. Applications may include, but are not limited to, messaging programs (e.g., chat programs, email programs, text messaging programs, etc.), navigation programs, games, scheduling programs (e.g., programs that allow a user maintain a list of appointments, etc.), social networking applications, and content-streaming programs (e.g., audio streaming applications, video streaming applications, etc.). In other implementations, an application installed on client device 102 may be pre-installed (e.g., by the manufacturer or retailer) and configured to receive content from content sources 108, 110. For example, a pre-installed media player application may be configured to download or stream a song from content source 108. An application executed by client device 102 may be configured to provide a device identifier for the application to content selection service 104. For example, the application may be configured to generate and/or provide a UDID or other device identifier to content selection service 104. Such a device identifier may be provided by client device 102 to content selection service 104 as part of a content selection request. For example, a game on client device 102 may request an advertisement from content selection service 104 to be presented within the game.

Content selection service 104 may receive and use history data associated with a device identifier to select relevant content for the user of client device 102. History data may be any data associated with a device identifier that is indicative of actions or events at client device 102 (e.g., visiting a webpage, interacting with presented content, conducting a search, making a purchase, downloading content, etc.). For example, a cookie may be sent from client device 102 to content selection service 104 when the user of client device 102 visits a particular webpage devoted to a topic. In another example, a non-browser application on client device 102 may provide history data to content selection service 104 when a particular type of event occurs in the application (e.g., the player reaches a new level of a game, a song or video clip finishes playing, etc.). In further examples, history data may include data regarding whether a particular piece of third-party content has already been provided to client device 102 or another device associated with the user of client device 102 (e.g., to control how often a particular piece of selected content is presented to a user). Based in part on the analyzed history data, content selection service 104 may select third-party content to be provided in conjunction with first-party content (e.g., as part of a displayed webpage, as a pop-up, within a video game, within another type of application, etc.).

Content selection service 104 may analyze received history data associated with a device identifier to identify one or more topics that may be of interest to the corresponding user. Content selection service 104 may then associate an identified topic with the device identifier. For example, content selection service 104 may perform text and/or image analysis on a webpage from content source 108, to determine one or more topics of a webpage visited by the device identifier. In some implementations, a topic may correspond to a predefined interest category used by content selection service 104. Such an interest category may be associated with the device identifier by content selection service 104. For example, a webpage devoted to the topic of golf may be classified under the interest category of sports. If history data for a device identifier signifies a visit to the golf-related webpage, the interest category of sports may be associated with the device identifier and used by content selection service 104 to select content for the device identifier. In some cases, interest categories used by content selection service 104 may conform to a taxonomy (e.g., an interest category may be classified as falling under a broader interest category). For example, the interest category of golf may be /Sports/Golf, /Sports/Individual Sports/Golf, or under any other hierarchical category.

For situations in which personal information about the user of client device 102 is collected or used to select third-party content, the user may be provided with an opportunity to control whether programs or features that may collect personal information (e.g., information about a user's social network, social actions or activities, a user's preferences, or a user's current location) do so, or an opportunity to control whether or how to receive content from content selection service 104 that may be more relevant to the user. In addition, certain data may be treated in one or more ways before it is stored or used by content selection service 104, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by content selection service 104.

The third-party content selected by content selection service 104 may be provided by content selection service 104 to client device 102 via network 106. For example, content source 110 may upload the third-party content to content selection service 104. Content selection service 104 may then provide the third-party content to client device 102 to be presented in conjunction with a first-party webpage provided by content source 108 or in a stand-alone application executed by client device 102. In other implementations, content selection service 104 may provide an instruction to client device 102 that causes client device 102 to retrieve the selected third-party content (e.g., from memory 114 of client device 102, from content source 110, etc.).

Third-party content selected by content selection service 104 for presentation by client device 102 may be associated with an application available for download from one of content sources 108-110 or content selection service 104 itself. For example, content selection service 104 may select and provide an advertisement that advertises an application (e.g., a game, a media player, etc.) or other data file (e.g., a music file, a video file, etc.) available for download. The third-party content associated with a downloadable application may be hotlinked or otherwise interactive such that clicking or otherwise interacting with the content via a user interface device causes client device 102 to navigate to the content source from which the application is available. In some implementations, the linked content source is an application market. For example, client device 102 may execute an application specifically configured to access the application market in response to the user of client device 102 clicking on an advertisement for a game application. In other implementations, the content source is a webpage or website provided by one of content sources 108-110 from which the application is available for download. For example, clicking on an advertisement for a downloadable game may cause client device 102 to launch a web browser that navigates to a webpage from which the application is available.

Content selection service 104 may select third-party content associated with a downloadable application based on a hardware and/or software configuration of client device 102. In some implementations, the hardware or software configuration of client device 102 may be reported to content selection service 104 via a web browser executed by client device 102. For example, a hypertext transfer protocol (HTTP) request for third-party content from client device 102 may include a browser agent header. A HTTP browser agent header may include, for example, information such as the type or version of the application making the request, the operating system of client device 102, or information regarding the layout engine of the application making the request. In some implementations, a webpage script may be included as part of a content tag on a webpage accessed by client device 102. The script may retrieve information regarding the configuration of client device 102 and report the configuration of client device 102 to content selection service 104. In some implementations, content selection service 104 may store system configuration data regarding client device 102 in conjunction with a device identifier for client device 102 (e.g., a cookie, a universal device identifier, an IP address, etc.) and retrieve the configuration data when a content selection request containing the request is received by content selection service 104.

In some cases, content selection service 104 selects third-party content for presentation within a non-browser application on client device 102 (e.g., an application in which the third-party content is not presented in conjunction with a webpage). The application may store or access data regarding the configuration of client device 102 and report the configuration data to content selection service 104. For example, a non-browser application executed by client device 102 may report on the device model, operating system, installed applications, or other such information to content selection service 104. According to further implementations, a software library or software development kit (SDK) used by a non-browser application on client device 102 may report the configuration of client device 102 to content selection service 104.

Content selection service 104 may match a configuration of client device 102 to system requirements for an application or other data file associated with third-party content, to determine whether the content is eligible to be selected for presentation by client device 102. For example, a navigation application may be installable only by mobile devices having a particular hardware platform. If client device 102 has a hardware platform that differs from the requirements of the application, content selection service 104 may determine that an advertisement for the application is not eligible to be selected for presentation by client device 102. In another example, content selection service 104 may determine that third-party content associated with a music file is ineligible to be selected for presentation by client device 102 if the configuration of client device 102 is such that the music file cannot be played by client device 102 (e.g., client device 102 has no speakers, client device 102 lacks the requisite software, etc.).

In some implementations, the system requirements of an application associated with third-party content may be specified explicitly to content selection service 104 by a provider of the application. For example, an application developer may specify device configurations when creating an advertising campaign via content selection service 104 to provide an advertisement only to devices having certain configurations.

In further implementations, content selection service 104 may automatically retrieve system requirements for an application from the content source from which the application is available for download. For example, content selection service 104 may parse the text of a webpage, application market, or the like from which the application is available for download to determine the system requirements of the application. In some cases, content selection service 104 may use unique application identifiers to distinguish the system requirements of different applications. Content selection service 104 may determine the system requirements of an application as an offline process (e.g., as a periodic batch job) or in real time when a content selection request is received from client device 102. In some implementations, content selection service 104 may receive the system requirements for an application via a feed from the application marketplace or other source from which the application is available. Content selection service 104 may also utilize parameters set by a third-party content provider to control how the system requirements are determined (e.g., content selection service 104 may allow a content provider to either manually specify the system requirements of the application or elect to have content selection service 104 automatically detect the system requirements by setting an auto-detect parameter).

In addition to the system configuration of client device 102, content selection service 104 may base the selection of third-party content on any number of other factors. In some implementations, content selection service 104 may conduct a content auction among third-party content providers to determine which third-party content is selected for presentation by client device 102. For example, content selection service 104 may compare bids associated with the different third-party content to determine which content is to be selected. Content selection service 104 may also determine a quality score associated with each piece of third-party content and use the quality score to select which third-party content is selected. In general, a quality score is a measure of the likelihood of the user of client device 102 clicking on a particular piece of third-party content, should it be selected. Such a quality score may be determined based on the previous performance of the third-party content and/or how well a topic of the content matches an identified interest of the user of client device 102.

Parameters specified by third-party content providers may also be used to control which third-party content is selected by content selection service 104. In some implementations, a third-party content provider may specify a topic of first-party content with which the third-party content is to be presented. For example, a developer of a football game application may specify that advertisements for the game are only to appear on webpages devoted to football. In further implementations, a third-party content provider may specify an interest category. If a device identifier for client device 102 is associated with the specified interest category, the third-party content may be eligible for selection. In a further implementation, content selection service 104 may select third-party content for client device 102 based on a geographic location of client device 102. For example, a third-party content provider may specify to content selection service 104 that they wish advertisements for the game to only be selected for devices located in the United States of America.

According to further implementations, content selection service 104 may also be configured to select first-party content that is eligible for presentation by client device 102 based on the configuration of client device 102. In other words, certain first-party content may also be filtered by client device 102 based on whether or not an application or other data file associated with the first-party content is supported by the configuration of client device 102. For example, assume that content source 108 is a search engine that provides first-party search results to client device 102. Also, assume that client device 102 performs a search for "golf games" via the search engine. In such a case, content selection service 104 may restrict the first-party links on the search result page based in part on whether a search result links to a game that can be installed and played by client device 102.

Figure 2:
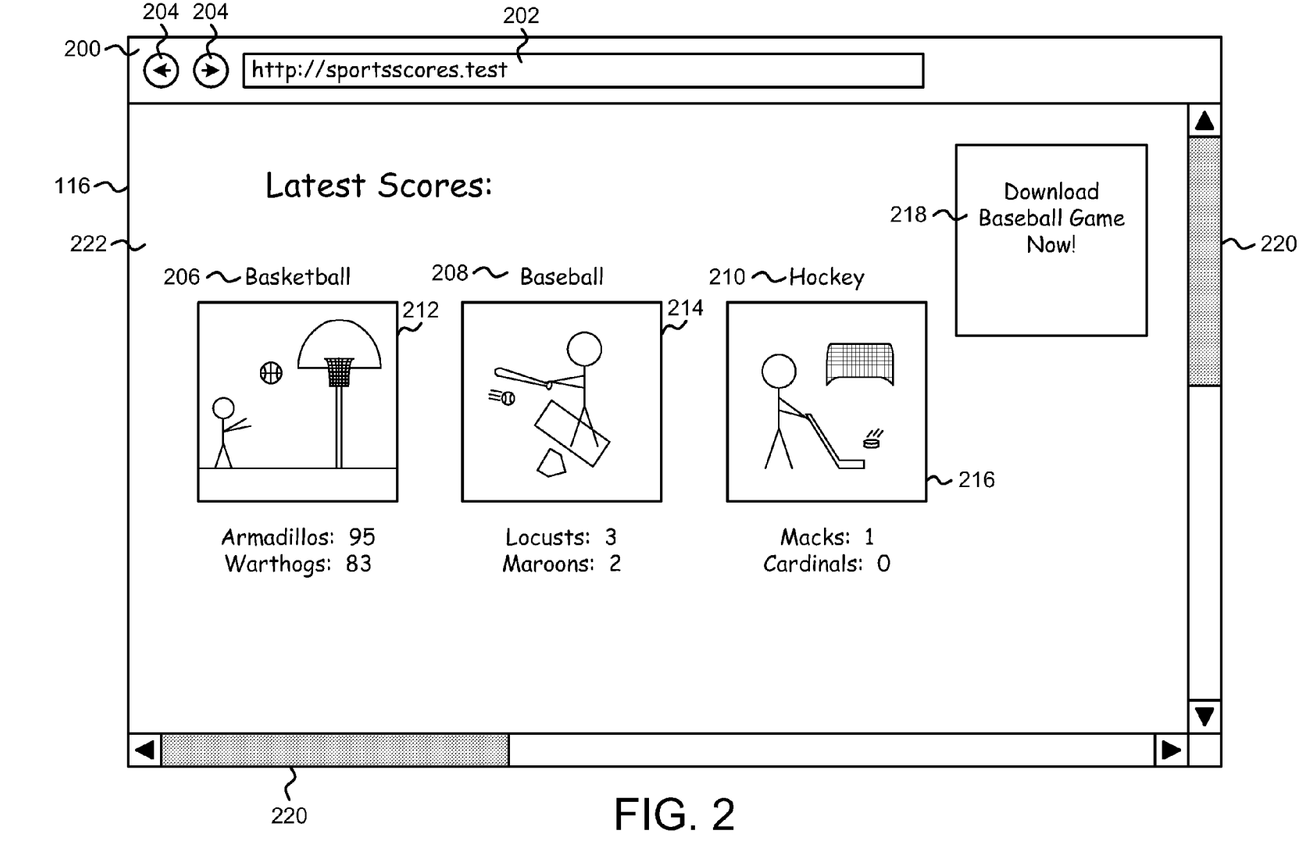
FIG. 2 depicts one implementation of an electronic display showing a webpage with selected third-party content.

Referring now to FIG. 2, an illustration is shown of electronic display 116 displaying an example webpage 222. Electronic display 116 is in electronic communication with processor 112 which causes visual indicia to be displayed on electronic display 116. As shown, processor 112 may execute a web browser 200 stored in memory 114 of client device 102, to display indicia of content received by client device 102 via network 106. In other implementations, another application executed by client device 102 may incorporate some or all of the functionality described with regard to web browser 200 (e.g., a video game, a chat application, etc.).

Web browser 200 may operate by receiving input of a uniform resource locator (URL) via a field 202 from an input device (e.g., a pointing device, a keyboard, a touch screen, etc.). For example, a URL may be entered into field 202. Processor 112 may use the inputted URL to request data from a content source having a network address that corresponds to the entered URL. In other words, client device 102 may request first-party content accessible at the inputted URL. In response to the request, the content source may return webpage data and/or other data to client device 102. Web browser 200 may analyze the returned data and cause visual indicia to be displayed by electronic display 116 based on the data.

In general, webpage data may include text, hyperlinks, layout information, and other data that may be used to provide the framework for the visual layout of webpage 222. In some implementations, webpage data may be one or more files of webpage code written in a markup language, such as the hypertext markup language (HTML), extensible HTML (XHTML), extensible markup language (XML), or any other markup language. The webpage data may include data that specifies where indicia appear on webpage 222, such as text 206, 208, 210. In some implementations, the webpage data may also include additional URL information used by web browser 200 to retrieve additional indicia displayed on webpage 222. For example, the webpage data may also include one or more instructions used by processor 112 to retrieve images 212, 214, 216 from their respective content sources.

Web browser 200 may include a number of navigational controls associated with webpage 222. For example, web browser 200 may be configured to navigate forward and backwards between webpages in response to receiving commands via inputs 204 (e.g., a back button, a forward button, etc.). Web browser 200 may also include one or more scroll bars 220, which can be used to display parts of webpage 222 that are currently off-screen. For example, webpage 222 may be formatted to be larger than the screen of electronic display 116. In such a case, the one or more scroll bars 220 may be used to change the vertical and/or horizontal position of webpage 222 on electronic display 116.

One or more content tags may be embedded into the code of webpage 222 that defines a content field located at the position of third-party content 218. Another content tag may cause web browser 200 to request additional content from content selection service 104, when webpage 222 is loaded. In other words, client device 102 may send a content selection request to content selection service 104. Such a request may include one or more keywords, an indication of the visit to webpage 222, or other data used by content selection service 104 to select content to be provided to client device 102. In one example, assume that content selection service 104 has already set a cookie on client device 102 via web browser 200. In such a case, the content selection request may include the cookie, to identify client device 102 to content selection service 104. In response, content selection service 104 may select third-party content 218 using the cookie or other device identifier sent as part of the request. For example, content selection service 104 may analyze history data associated with the cookie and/or history data associated with any other device identifier linked to the cookie, to select third-party content 218. If the content selection request does not include a device identifier, content selection service 104 may set a cookie or other device identifier at this time for use with future requests from client device 102.

As a result of content selection service 104 receiving the cookie set via web browser 200 whenever client device 102 visits a website that uses the selection service, content selection service 104 may also receive history data for the cookie. For example, content selection service 104 may receive history data indicative of webpage 222 being visited by the device identifier, when webpage 222 was visited, and one or more topics of webpage 222. In some implementations, content selection service 104 may use text recognition on webpage 222 (e.g., on text 206, 208, 210, etc.) and/or image recognition on webpage 222 (e.g., on images 212, 214, 216, etc.), to determine one or more topics of webpage 222. In further implementations, webpage data for webpage 222 may include metadata that identifies the topic. Such topics may then be used to select content for the cookie and/or any other device identifiers linked to the cookie.

According to various implementations, web browser 200 may send information regarding the hardware and/or software configuration of client device 102 to content selection service 104 as part of a content selection request. If a cookie is included in a content selection request from client device 102, content selection service 104 may store and associate any accompanying system information with the cookie. In some implementations, a header of the content selection request may include hardware and/or software information regarding client device 102. For example, web browser 200 may send a browser agent header that identifies the type of the browser, the operating system of client device 102, or other such information as part of an HTTP formatted content selection request. In other examples, other communication protocols that include a browser agent header may be used by web browser 200 to send a content selection request to content selection service 104.

In some cases, a content tag in the code of webpage 222 may be a script executed by web browser 200 when webpage 222 is loaded. In various implementations, the script may determine a hardware and/or software configuration of client device 102. For example, an embedded script on webpage 222 may query which plugins are installed in web browser 200 or whether client device 102 uses hardware accelerated graphics. The script may determine any information regarding the hardware or software of client device 102. For example, the script may determine the make, model, processor, memory size, operating system, installed software, or the like of client device 102. The script may include the determined system information when sending a content selection request to content selection service 104.

Content selection service 104 may select third-party content 218 based on the system configuration of client device 102 and any other factors. As shown, third-party content 218 is an advertisement for a downloadable baseball game application. Interacting with third-party content 218 may cause web browser 200 to navigate to a location from which the game is available for download. In various implementations, content selection service 104 may determine whether third-party content 218 is eligible for presentation by client device 102 based on the received hardware and/or software configuration of client device 102. For example, content selection service 104 may filter advertisements and other third-party content for downloadable applications based on the configuration of client device 102, prior to selection.

In some implementations, content selection service 104 may select third-party content 218 based on factors in addition to the configuration of client device 102. Example factors that may be used by content selection service 104 to select third-party content may include, but are not limited to, the results of a content auction (e.g., content selection service 104 may compare a bid amount associated with third-party content 218 to bids from other content providers), a quality score associated with third-party content 218 (e.g., a measure of the likelihood of the user of client device 102 clicking on third-party content 218), a topic of webpage 222, or an interest category associated with a device identifier for client device 102. In one example, third-party content 218 may be selected based in part on a match between a topic of webpage 222 and a topic of the game application (e.g., based on both the game and webpage 222 being devoted to baseball). In another example, assume that web browser 200 is used to visit a number of webpages devoted to baseball. In such a case, a cookie set via web browser 200 may be associated with the interest category of baseball, which is then used by content selection service 104 to select third-party content 218 for presentation on webpage 222.

In some implementations, content selection service 104 may provide third-party content 218 directly to client device 102. In other implementations, content selection service 104 may send a command to client device 102 that causes client device 102 to retrieve third-party content 218. For example, the command may cause client device 102 to retrieve third-party content 218 from a local memory, if third-party content 218 is already stored in memory 114, or from a networked content source. In this way, any number of different pieces of content may be placed in the location of third-party content 218 on webpage 222. In other words, one user that visits webpage 222 may be presented with third-party content 218 and a second user that visits webpage 222 may be presented with different content. Other forms of content (e.g., an image, text, an audio file, a video file, etc.) may be selected by content selection service 104 for display with webpage 222 in a manner similar to that of third-party content 218. In further implementations, content selected by content selection service 104 may be displayed outside of webpage 222. For example, content selected by content selection service 104 may be displayed in a separate window or tab of web browser 200, may be presented via another software application (e.g., a text editor, a media player, etc.), or may be downloaded to client device 102 for later use.

Figure 3:
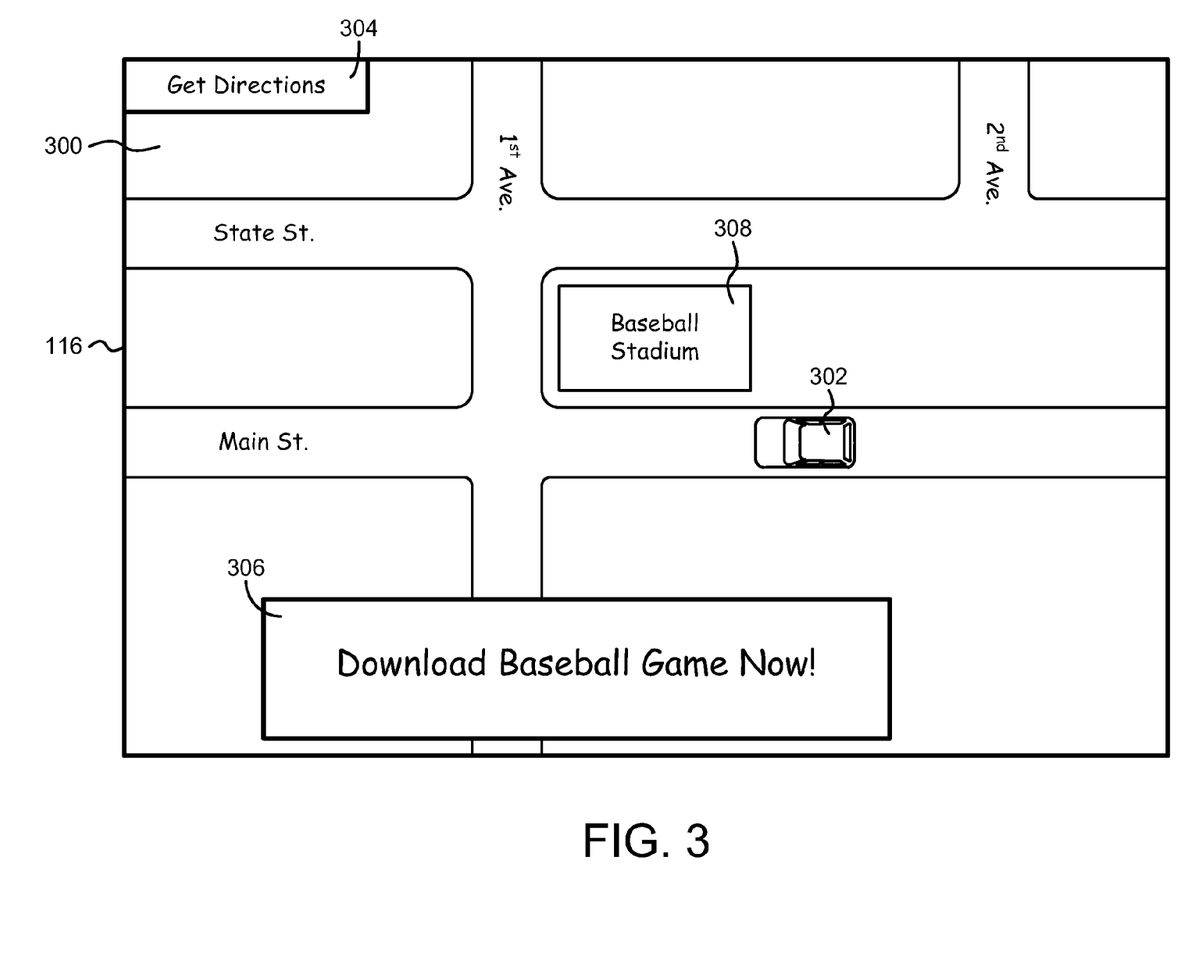
FIG. 3 depicts one implementation of an electronic display showing an application with selected third-party content.

Referring now to FIG. 3, an application displaying selected content is shown, according to one illustrative example. As shown, client device 102 may execute a navigation application 300. In general, navigation application 300 operates by determining the location of client device 102 and providing indicia, such as a map, to electronic display 116. For example, client device 102 may include a GPS receiver and/or may use cellular triangulation to determine its location. Navigation application 300 may use the determined location to retrieve a map of the location either from a local memory or from a remote source. Navigation application 300 may then provide the map to electronic display 116 with an indication 302 of the determined location of client device 102. Navigation application 300 may also include a selectable input 304 configured to allow the user of client device 102 to obtain directions to another geographic location. For example, the user of client device 102 may select input 304 to obtain driving directions from the location indicated by indication 302 to another location.

Navigation application 300 may be configured to send a UDID or other form of device identifier as part of a content selection request to content selection service 104. In some implementations, the UDID may be a hashed value, thereby anonymizing the UDID to ensure the privacy of the user of client device 102. Such a content selection request may include various information, such as the general or specific location of client device 102 or the current actions performed via navigation application 300. For example, the content selection request may also indicate that navigation application 300 is currently being used to obtain driving directions to the nearest pizza restaurant.

According to various implementations, the content selection request sent by application 300 to content selection service 104 may include information regarding the hardware and/or software configuration of client device 102. Hardware and/or software information sent by application 300 to content selection service 104 may include, but is not limited to, the make, model, operating system, installed applications, memory size, version information, CPU speed, graphics accelerators, peripheral devices (e.g., whether client device 102 has a GPS receiver, a camera, etc.), or other such configuration information of client device 102. In some implementations, application 300 may use an SDK associated with content selection service 104 to include third-party content in the first-party application 300. In further implementations, client device 102 may execute another application (e.g., a different application than application 300) that is configured to collect and report system information regarding client device 102 to content selection service 104. The other application may report the system information synchronously with a content selection request from application 300 or at any other time (e.g., the system information may be reported periodically to content selection service 104, in response to a request for system information from content selection service 104, etc.).

In response to receiving the content selection request from navigation application 300, content selection service 104 may select third-party content 306 for presentation within application 300. As shown, third-party content 306 is an advertisement for a downloadable baseball game application. Interacting with third-party content 306 (e.g., clicking on content 306, touching a touch screen in the area of content 306, etc.) may cause client device 102 to launch a web browser or marketplace application that navigates to a location from which the game can be downloaded.

Third-party content 306 may be selected based in part on the received system information regarding client device 102. For example, content selection service 104 may determine that third-party content 306 is eligible for presentation in application 300 based on a match between the system requirements of the baseball game and the received system configuration of client device 102. The system requirements of the game may be software-based requirements, such as software that run in conjunction with the game (e.g., a multimedia player, a web browser, etc.) or a particular operating system. The system requirements of the game may also be hardware-based requirements, such as certain peripheral requirements (e.g., the game may require a touch-screen display, etc.), GPU requirements, processing speed requirements, or memory requirements (e.g., available hard disk space, RAM, etc.).

Third-party content 306 may also be selected based on any other data associated with client device 102. In some implementations, content selection service 104 may select third-party content 306 based in part on history data associated with a device identifier for client device 102. For example, the history data may indicate that client device 102 was used to visit a number of webpages devoted to baseball. In further implementations, third-party content 306 may be selected based on a geographic location of client device 102. For example, assume that client device 102 is located near a baseball stadium 308. Based in part on the close proximity of client device 102 to baseball stadium 308, third-party content 306 may be selected for presentation in application 300 since the game is also related to baseball.

Figure 4:
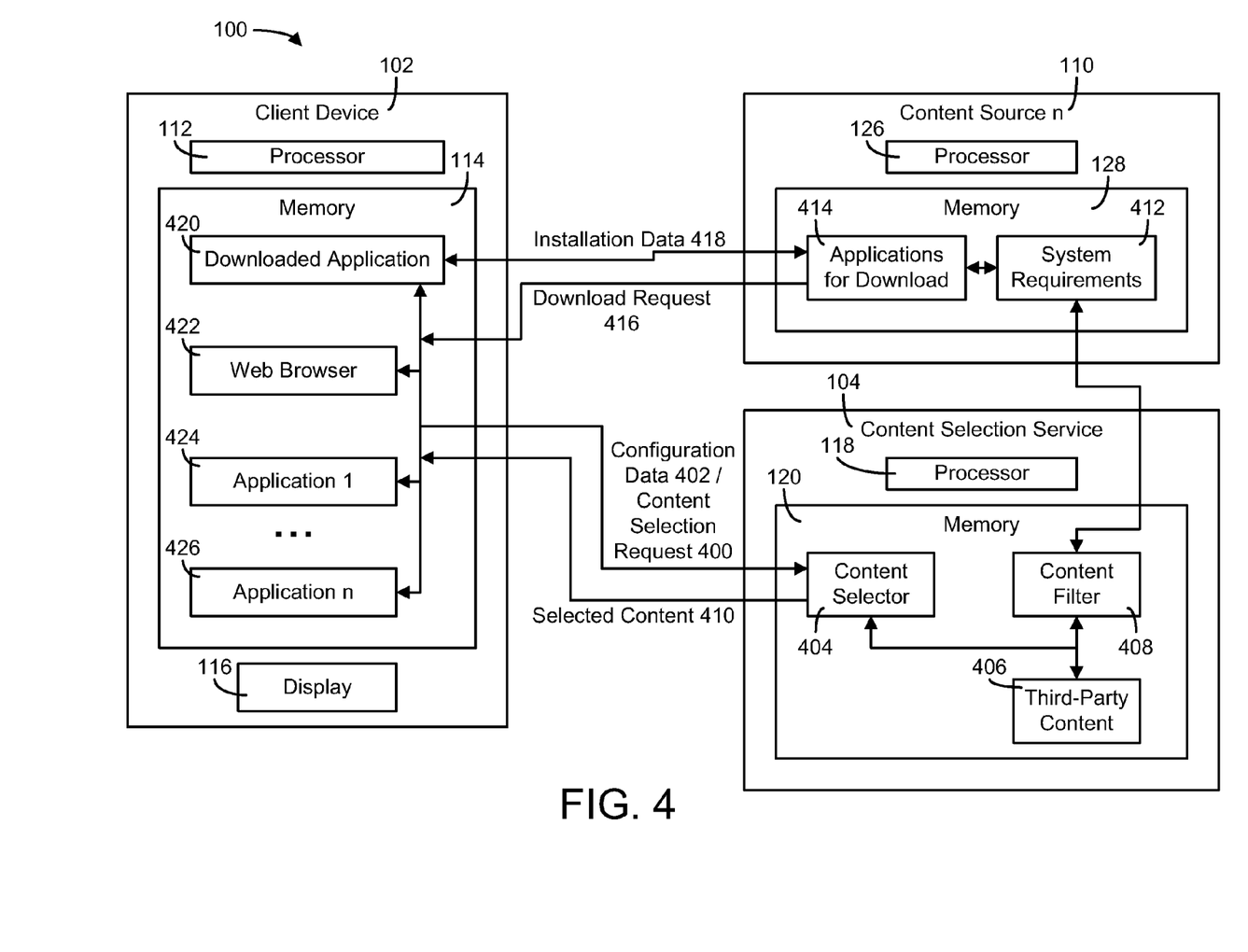
FIG. 4 is a block diagram of the computer system of FIG. 1 in which content is selected based on a device configuration, according to some implementations.

Referring now to FIG. 4, a block diagram is shown of the computer system 100 of FIG. 1 in which content is selected based on a device configuration, according to some implementations. In the example shown, client device 102, content selection service 104, and content source 110 communicate with one another via network 106 to facilitate the selection of third-party content for presentation by client device 102. In particular, third-party content is selected by content selection service 104 based in part on whether the configuration of client device 102 is supported by an application associated with the third party content.

Client device 102 may store and execute any number of first-party applications in which third-party content selected by content selection service 104 may be presented. As shown, client device 102 may include a web browser 422 which is configured to retrieve and display webpages available from content sources via network 106 (e.g., a search result webpage of an online search engine, a visited webpage, etc.). Client device 102 may also include non-browser applications 424-426 (e.g., a first application through nth application). In general, applications 424-426 differ from web browser 422 in that web browser 422 is configured to retrieve webpages in response to a URL specified by the user of client device 102. Applications 424-426, in contrast, may be configured to only retrieve specific webpages, access predefined online services (e.g., the accessed services are included in the code of applications 424-426), launch web browser 422 to retrieve a webpage, or not use any webpage data at all. For example, applications 424-426 may be communications programs (e.g., email programs, instant messenger programs, etc.), productivity programs (e.g., text editors, software development programs, spreadsheet applications, etc.), social networking programs, multimedia players (e.g., music players, movie players, etc.), games, navigation programs, or any other form of application.

Web browser 422 may access a first-party webpage and provide the webpage for presentation on display 116. In some implementations, the webpage may include a content tag that causes web browser 422 to send a content selection request 400 to content selection service 104. Content selection request 400 may request, for example, third-party content to be selected for presentation in conjunction with the first-party webpage (e.g., as content embedded in the webpage, in a popup window, etc.). In some cases, content selection request 400 includes a device identifier for client device 102, such as a cookie set by content selection service 104. Other information that may be included in content selection request 400 may include a topic of the webpage being accessed by web browser 422, the address of the webpage being accessed, or other such information.

Any of applications 424-426 may also generate content selection request 400 in addition to, or in lieu of, web browser 422 making the request. Applications 424-426 may, in some implementations, utilize a common SDK associated with content selection service 104 to include third-party content within the applications (e.g., a common SDK on client device 102 may be invoked by any of applications 424-426 to generate content selection request 400). For example, the developers of applications 424-426 may use an advertising SDK in the applications to generate advertising revenue when applications 424-426 are used. Content selection request 400 may be generated by applications 424-426 at any time. For example, applications 424-426 may generate content selection request 400 periodically, after a certain amount of time has passed during use, at a specific point in time during use (e.g., in between levels of a game, in between songs being played, etc.), or in response to a trigger within the application. Similar to web browser 422, applications 424-426 may include a device identifier (e.g., a UDID or another identifier) in content selection request 400.

Web browser 422 and/or applications 424-426 may also provide configuration data 402 to content selection service 104. In some implementations, configuration data 402 is provided in conjunction with content selection request 400 and may even be part of content selection request 400. In other implementations, configuration data 402 is provided separately from content selection request 400, concurrently with content selection request 400 or at another time. For example, one of applications 424-426 may send configuration data 402 to content selection service 104 periodically (e.g., nightly, weekly, etc.), in response to a configuration change at client device 102, or in response to a request for configuration data 402 from content selection service 104.

Configuration data 402 may include any information regarding the hardware and/or software configuration of client device 102. Software configuration information may include, but is not limited to, the applications installed on client device 102, the operating system of client device 102, the version of software installed on client device 102, plug-ins or add-ons for an application on client device 102, software-based audio or video accelerators, networking software, encryption software, or the like. Hardware configuration information may include, but is not limited to, the actual make or model client device 102, the chipset of processor 112, metrics indicative of the use of processor 112 (e.g., the average % use of processor 112 at any given time), metrics indicative of the use of memory 114 (e.g., a metric indicative of the available storage in memory 114 at any given time), peripheral devices of client device 102 (e.g., whether display 116 is a touch screen display, whether client device 102 includes a GPS receiver, camera, etc.), or other hardware configuration information.

In some implementations, configuration data 402 is included by web browser 422 in a browser agent header of content selection request 400. For example, web browser 422 may report configuration information to content selection service 104 regarding the type of web browser 422, the version of web browser 422, the operating system of client device 102, or any other information regarding web browser 422. In other implementations, a script executed by web browser 422 generates and provides configuration data 402 to content selection service 104. For example, a first-party webpage being accessed by web browser 422 may include a script that generates configuration data 402 and provides it to content selection service 104 with content selection request 400.

In further implementations, applications 424-426 may generate and provide configuration data 402 to content selection service 104. In some cases, configuration data 402 may include more information regarding the hardware or software configuration of client device 102 than that of a browser agent header generated by web browser 422. For example, applications 424-426 may have access to the full list of applications installed by client device 102 (e.g., from an application marketplace application, from the operating system of client device 102, etc.) or the peripheral devices of client device 102. In some implementations, one of applications 424-426 may receive configuration data 402 from another one of applications 424-426 to provide to content selection service 104. For example, one of applications 424-426 may be an application executed at startup of client device 102 that verifies the hardware and/or software configuration of client device 102 (e.g., a configuration monitoring program). When another of applications 424-426 generates content selection request 400, it may also retrieve configuration data 402 determined by the configuration monitoring program and include configuration data 402 in content selection request 400.

Content selection service 104 may store and execute any number of software modules to select third-party content for presentation by client device 102. As shown, content selection service 104 may include a content selector 404 and content filter 408, which are software components stored in memory 120 and executed by processor 118. In some cases, content selection service 104 also stores third-party content 406 from any number of third-party content providers. In other implementations, third-party content 406 is stored by other computing devices on network 106 (e.g., content sources 108-110, client device 102, etc.). In such cases, content selection service 104 may provide an indication of the selected third-party content to client device 102 which then retrieves the third-party content for presentation.

Third-party content 406 may include text, images, or multimedia files specified by third-party content providers. In some implementations, third-party content 406 is also interactive (e.g., a user may interact with the content via a user interface device). For example, third-party content 406 may be configured to cause client device 102 to perform operations in response to third-party content 406 being clicked by a user of client device 102. The operations may cause client device 102 to launch a marketplace application (e.g., one of applications 422-424) configured to download and install applications to client device 102. The operations may also cause web browser 422 to navigate to a particular webpage or website. For example, clicking on a third-party advertisement for golf clubs may cause web browser 422 to navigate to an online retail store of the third-party content provider at which golf clubs may be purchased.

Some or all of third-party content 406 may be associated with applications 414 available for download from content source 110. In some cases, content source 110 is a web server that serves one or more webpages from which applications 414 may be downloaded. In other cases, content source 110 is an online application marketplace from which applications 414 may be downloaded. Associated with applications 414 may be system requirements 412. System requirements 412 generally indicate the preferred, supported, or minimum system requirements to download and install applications 414. System requirements 412 may include hardware and/or software requirements for applications 414 to be installed by client device 102. For example, system requirements 412 may indicate that a particular application in applications 414 is only available for installation by mobile devices running the "Robot" operating system version 3.0 or higher. In another example, system requirements 412 may indicate that a touch-screen based game in applications 414 requires client device 102 to have a touch-screen display to install the game.

In some implementations, system requirements 412 may be determined by one or more computing devices in communication with content selection service 104. For example, content selection service 104 may communicate with a farm of computing devices having different configurations. The computing devices may attempt to install and execute applications 414 to determine system requirements 412, if system requirements 412 are not available from content source 110. Thus, the system requirements 412 of applications 414 may be determined automatically, in some implementations.

Content selector 404 is configured to select content 410 from among third-party content 406, in response to receiving content selection request 400. Content selector 404 may then return selected content 410 to client device 102 for presentation (e.g. by web browser 422 or one of applications 424-426) or may return an indication that content 410 was selected (e.g., thereby causing client device 102 to retrieve the selected third-party content). Content selector 404 may base the selection of content 410 on any number of parameters such as a topic of the first-party content with which selected content 410 is to be presented, an interest category associated with a device identifier in content selection request 400 (e.g., based on a stored history of visited websites or other online actions performed by client device 102), a geographic location of client device 102, a quality score associated with content 410, or other such information. In some implementations, content selector 404 may conduct a content auction to select content 410. In a content auction, content selector 404 may compare bids associated with third-party content 406 to select content 410. For example, an advertiser having an advertisement in third-party content 406 may place a bid of $5 in the auction that indicates the advertiser is willing to pay $5 if the user of client device 102 clicks on his or her advertisement.

In cases in which third-party content 406 includes third-party content associated with one of applications 414 available for download, content selector 404 may use content filter 408 to determine which of third-party content 406 is eligible for selection based on configuration data 402. Content filter 408 may be configured to compare system requirements 412 for one of applications 414 to configuration data 402 received from client device 102, to determine whether the third-party content associated with the application is eligible for presentation by client device 102 (e.g., whether the configuration of client device 102 meets the installation requirements of the application). Content filter 408 may notify content selector 404 as to whether or not a piece of content in third-party content 406 is eligible for selection. For example, selected content 410 may be an advertisement for a game available for download and selected based on a determination that client device 102 can install and run the game.

In various implementations, content filter 408 may automatically (e.g., without further input from a third-party content provider) retrieve system requirements 412 from content source 110. In some implementations, content filter 408 may perform text recognition or text analysis on a webpage or download screen from content source 110 from which one of applications 414 is available for download, to identify system requirements 412. For example, assume that an advertisement in third-party content 406 for a game in applications 414 includes a link to the webpage or portion of an application marketplace from which the game is available for download. In such a case, content filter 408 may traverse the link and analyze the screen or webpage from which the game is available for download to identify the system requirements to install the game. In other implementations, system requirements 412 may be received by content filter 408 via a feed from content source 110 (e.g., content source 110 may report system requirements 412 to content selection service 104). In some implementations, content filter 408 may determine whether or not client device 102 can install a particular application in applications 414 as an offline process (e.g., not in response to receiving content selection request 400). For example, content filter 408 may uniquely identify applications 414, compare configuration data 402 associated with a device identifier for client device 102 to system requirements 412, and associate the device identifier with only those of applications 414 eligible for installation by client device 102. In response to receiving a content selection request that includes the device identifier, content selection service 104 may then retrieve the eligible applications and their corresponding third-party content for use by content selector 404. In yet further implementations, system requirements 412 may be manually associated with third-party content 406 by a third-party content provider or another such entity. For example, an advertiser of a mobile application may specify the system requirements of the application when uploading an advertisement for the application to content selection service 104.

After selected content 410 is presented by web browser 422 or one or applications 424-426, the user of client device 102 may decide to learn more about the corresponding application or download the application outright. In some implementations, selected content 410 is interactive content and redirects client device 102 to a webpage or marketplace screen from which the application may be downloaded. In other implementations, selected content 410 is not interactive (e.g., an impression-based advertisement or the like). If the user of client device 102 decides to download the corresponding application, client device 102 may issue a download request 416 to content source 110 for the application. In response, content source 110 may provide installation data 418 to client device 102. Installation data 418 may be executed automatically upon download or in response to input from the user of client device 102 (e.g., the user clicks on an install icon, the user confirms the installation, etc.). As a result of the installation process, downloaded application 420 is installed into memory 114 and made available for use by the user of client device 102.

Figure 5:
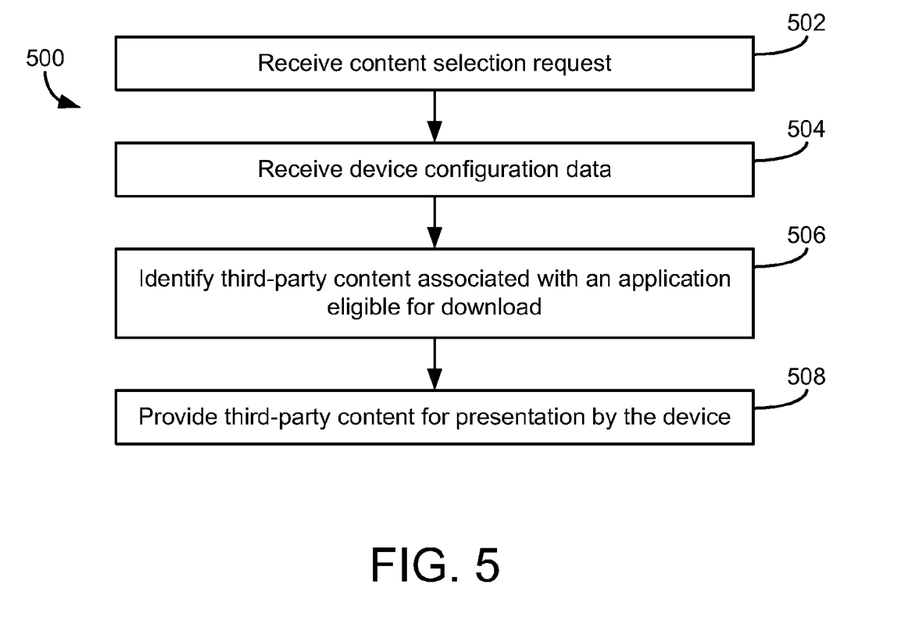
FIG. 5 is a flow diagram depicting the steps taken in one implementation of a process for selecting third-party content based on a device configuration, according to various implementations.

Referring now to FIG. 5, a flow diagram is shown of a process 500 for selecting third-party content based on a device configuration, according to various implementations. In general, process 500 allows third-party content (e.g., an advertisement or the like) featuring a downloadable application to be selected for presentation by a client device based on whether or not the client device is able to install and run the application. Process 500 may be implemented by one or more computing devices executing stored machine instructions. For example, process 500 may be implemented by a content selection service, such as content selection service 104 shown in FIGS. 1 and 3.

Process 500 may include receiving a content selection request (block 502). In some implementations, the content selection request is received from a web browser executed by the client device. For example, a first-party webpage being accessed by a the web browser may include a content tag or other instruction that causes the web browser to generate a content selection request. In another implementation, the content selection request may correspond to a search being performed by the web browser via an online search engine. For example, a search for "most popular games" may indicate that third-party content should be selected for presentation as part of the search result webpage. In further implementations, the content selection request may be received from a non-browser application executed by the client device. The content selection request may be received in response to a particular action being performed by the client device (e.g., visiting a webpage, performing a web search, etc.), reaching a trigger point within a non-browser application (e.g., upon completing a level in a game, reaching the end of played media content, etc.), or at predetermined time intervals (e.g., every five minutes when an application is run).

Process 500 may include receiving device configuration data for the client device (block 504). The device configuration data may indicate a hardware and/or software configuration of the client device. For example, the device configuration data may indicate the type or version of an installed application or other software component on the device (e.g., the operating system of the device, an application on the device, a plug-in for an application on the device, etc.), the presence of a hardware peripheral on the device (e.g., a camera, touch-screen display, GPS receiver, etc.), the make or model of the device, or performance metrics regarding the hardware of the device (e.g., the clock speed of the device's processor, the amount of RAM or hard disk available on the device, etc.).

The device configuration data may be received as part of the content selection request, in conjunction with the content selection request, or at another time, according to various implementations. In some implementations, the device configuration data is included as part of a browser agent header of the content selection request. In further implementations, a webpage script or monitoring application on the client device may generate the device configuration data. In further implementations, a non-browser application in which the third-party content is to be presented may generate the device configuration data.

Process 500 may include identifying third-party content associated with an application eligible for download by the client device (block 506). In some cases, a third-party advertisement or the like may feature an application available for download. In such cases, system requirements for the application may be compared to the received device configuration data to determine whether the application is eligible for download by the client device. For example, the downloadable application may require that the client device has a particular type or version of operating system to install the application. In another example, the downloadable application may require that the client device have a particular type of peripheral or set of installed software, to support the application. In some implementations, the third-party content may be prevented from being selected if the corresponding application has already been installed by the client device (e.g., as indicated by the received device configuration data).

The system requirements of a downloadable application may be manually specified or automatically detected, according to various implementations. In some implementations, the system requirements for the application may be specified manually with the third-party content. In other implementations, a link associated with the third-party content (e.g., a link to a location from which the application can be downloaded) may be traversed automatically, to determine the system requirements of the application. For example, a content selection service may analyze the text of the webpage or screen of an application marketplace, to identify system requirements for the downloadable application. In further implementations, the system requirements may be provided to a content selection service from the download source. For example, an application marketplace may provide a feed (e.g., an XML feed, a text feed, etc.) that includes data regarding the available applications and the system requirements of the applications. Such a feed may be provided to the content selection service periodically, in response to an update to the system requirements of an application (e.g., a new application becomes available, a new version of an application becomes available, etc.), or in response to a request from the content selection service.

Process 500 may include providing the identified third-party content for presentation by the client device (block 508). In various implementations, the third-party content may be selected for presentation by the client device based on any number of factors in addition the to corresponding application being eligible for download by the client device. Factors that may be used to select the third-party content may include, but are not limited to, a geographic location of the client device, search terms used by the client device as part of a search, a quality score associated with the third-party content, a topic of the first-party content with which the third-party content is to be presented, an interest category associated with a device identifier for the client device, the results of a content auction, campaign parameters associated with the third-party content (e.g., parameters that control how and when the third-party content provider participates in a content auction), or other such factors. For example, a user may conduct a search for "baseball video games" via an online search engine. In response, an advertisement for a particular video game may be included in the search results, if the game is determined to be eligible for download by the client device. By controlling the selection of third-party content to only devices that can install the featured application, the third-party content provider may realize a higher return on investment for advertising the application. In addition, users are only presented with third-party content featuring applications that they can actually download and use, thereby ensuring that the third-party content is relevant to the users.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method for serving a content comprising:
   receiving, by one or more processors, from a mobile client device, a content selection request;
   receiving, by one or more processors, configuration data associated with the mobile client device, the configuration data including an operating system and at least one of a client device make, a client device model, a performance metric of a hardware device of the mobile client device, an indication of the presence of a hardware device, an application installed on the mobile client device, or a plug-in for an application installed on the mobile client device;
   receiving, by one or more processors, a set of requirements for an application associated with a content, the content separate from the application;
   determining, by one or more processors, the content is eligible for selection based, at least in part, on a comparison of the configuration data associated with the mobile client device and the set of requirements for the application associated with the content;
   selecting, by one or more processors, the content responsive to the content selection request; and
   serving, by one or more processors, the determined content.

2. The method of claim 1 further comprising:
   automatically retrieving, using one or more processors, the set of requirements for the application associated with the content.

3. The method of claim 2, wherein the automatic retrieving of the set of requirements includes performing a text analysis of a source from which the application is available for download.

4. The method of claim 3, wherein the source is a landing page of an application marketplace.

5. The method of claim 3, wherein the source is identified via a link associated with the content.

6. The method of claim 2, wherein the automatic retrieving of the set of requirements includes receiving a feed from an application marketplace having data indicative of the set of requirements of the application.

7. The method of claim 1, wherein the receiving of the set of requirements for the application associated with the content is specified by a third-party content provider.

8. The method of claim 1, wherein the configuration data is included in a browser agent header.

9. The method of claim 1, wherein the configuration data is received from an application executing on the client device.

10. A system comprising:
    one or more processors; and
    a storage device storing instructions that, when executed by the one or more processors, cause the one or more processors to perform operations comprising:
    receiving, from a mobile client device, a content selection request;
    receiving configuration data associated with the mobile client device, the configuration data including an operating system and at least one of a client device make, a client device model, a performance metric of a hardware device of the mobile client device, an indication of the presence of a hardware device, an application installed on the mobile client device, or a plug-in for an application installed on the mobile client device;
    determining a content eligible for selection based, at least in part, on a comparison of the configuration data associated with the mobile client device and a set of requirements for an application associated with the content, the content separate from the application; and
    serving the determined content.

11. The system of claim 10, wherein the storage device stores further instructions that cause the one or more processors to perform operations further comprising:
    automatically retrieving the set of requirements for the application associated with the content.

12. The system of claim 11, wherein the automatic retrieving of the set of requirements includes performing a text analysis of a landing page of an application marketplace identified via a link associated with the content.

13. The system of claim 12, wherein the text analysis of the landing page is an offline process.

14. The system of claim 11, wherein the automatic retrieving of the set of requirements includes receiving a feed from an application marketplace having data indicative of the set of requirements of the application.

15. The system of claim 11, wherein the automatic retrieving of the set of requirements includes installing the application on a farm computing device.

16. A non-transitory computer readable storage device storing instructions that, when executed by one or more processors, cause the one or more processors to perform operations comprising:
    receiving, from a client device, a content selection request;
    receiving configuration data associated with the client device;
    determining a content eligible for selection based, at least in part, on a comparison of the configuration data associated with the client device and a set of requirements for an application associated with the content, the content separate from the application, the content configured to cause the client device to execute operations to redirect to a content source from which the application associated with the content may be downloaded responsive to a selection of the content via an interface of the client device; and
    serving the determined content.

17. The non-transitory computer readable storage device of claim 16, wherein the configuration data includes at least one of a client device make, a client device model, an operating system, a performance metric of a hardware device of the client device, an indication of the presence of a hardware device, an application installed on the client device, or a plug-in for an application installed on the client device.

18. The non-transitory computer readable storage device of claim 16, wherein the configuration data is included in a browser agent header.

19. The non-transitory computer readable storage device of claim 16, wherein the configuration data is received from an application executing on the mobile client device.

20. The non-transitory computer readable storage device of claim 16 storing instructions that cause the one or more processors to perform operations further comprising:
   automatically retrieving a set of requirements for an application associated with the content from a landing page of an application marketplace identified via a link associated with the content.

\* \* \* \* \*